United States Patent
Huang

(10) Patent No.: US 8,986,616 B2
(45) Date of Patent: Mar. 24, 2015

(54) ULTRASONIC OSCILLATION MACHINE

(76) Inventor: Lynn L. H. Huang, Tainan (TW)

(*) Notice: Subject to any disclaimer, the term of this patent is extended or adjusted under 35 U.S.C. 154(b) by 403 days.

(21) Appl. No.: 13/596,488

(22) Filed: Aug. 28, 2012

(65) Prior Publication Data

US 2013/0058834 A1 Mar. 7, 2013

Related U.S. Application Data

(60) Provisional application No. 61/531,438, filed on Sep. 6, 2011, provisional application No. 61/531,028, filed on Sep. 5, 2011.

(51) Int. Cl.
*B06B 1/00* (2006.01)
*B01J 4/00* (2006.01)
*B01J 19/10* (2006.01)

(52) U.S. Cl.
CPC . *B01J 4/002* (2013.01); *B01J 19/10* (2013.01)
USPC .......................................... 422/128

(58) Field of Classification Search
CPC ........................................ B06B 1/00
USPC .......................................... 422/128
See application file for complete search history.

(56) References Cited

U.S. PATENT DOCUMENTS 2,958,332 A * 11/1960 Schueler ................ 134/169 R
6,244,279 B1 * 6/2001 Bowden ....................... 134/71

* cited by examiner

*Primary Examiner* — Sean E Conley
(74) *Attorney, Agent, or Firm* — patenttm.us

(57) ABSTRACT

An ultrasonic oscillation machine for manufacturing porous collagen matrices has a hollow body, a vessel, a conveyor, multiple frames, multiple oscillation devices and an ultrasonic mechanism. The vessel is mounted in the body. The frames are connected to the conveyor. The conveyor moves the frames to leave from or to be put into the vessel. Each frame has multiple containers to carry subjects. The oscillation devices are connected respectively to the frames. The ultrasonic mechanism is mounted in the vessel. During the manufacturing process, the oscillation devices and the ultrasonic mechanism operate to provide affection. Then the connective tissues in the containers gradually become porous collagen matrices.

9 Claims, 4 Drawing Sheets

ULTRASONIC OSCILLATION MACHINE

CROSS-REFERENCE TO RELATED PATENT APPLICATION(S)

This application claims the benefit of a U.S. provisional Patent Application No. 61/531,438 filed on Sep. 6, 2011, the disclosure of which is incorporated herein in its entirety by reference.

BACKGROUND OF THE INVENTION

1. Field of the Invention

The present invention relates to an ultrasonic oscillation machine, especially to an ultrasonic oscillation machine for manufacturing porous collagen matrices.

2. Description of the Prior Arts

Collagen is widely used in modern society. Biotechnology industry endeavors to manufacture collagen faster with good quality. Therefore, manufacturing porous collagen matrices from connective tissues accordingly becomes an important issue.

SUMMARY OF THE INVENTION

The main objective of the present invention is to provide an ultrasonic oscillation machine for manufacturing porous collagen matrices. The ultrasonic oscillation machine has a hollow body, a vessel, a conveyor, multiple frames, multiple oscillation devices and an ultrasonic mechanism. The vessel is mounted in the body. The frames are connected to the conveyor. The conveyor moves the frames to leave from or to be put into the vessel. Each frame has multiple containers to carry subjects. The oscillation devices are connected respectively to the frames. The ultrasonic mechanism is mounted in the vessel. During the manufacturing process, the oscillation devices and the ultrasonic mechanism operate to provide affection. Then the connective tissues in the containers gradually become porous collagen matrices.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
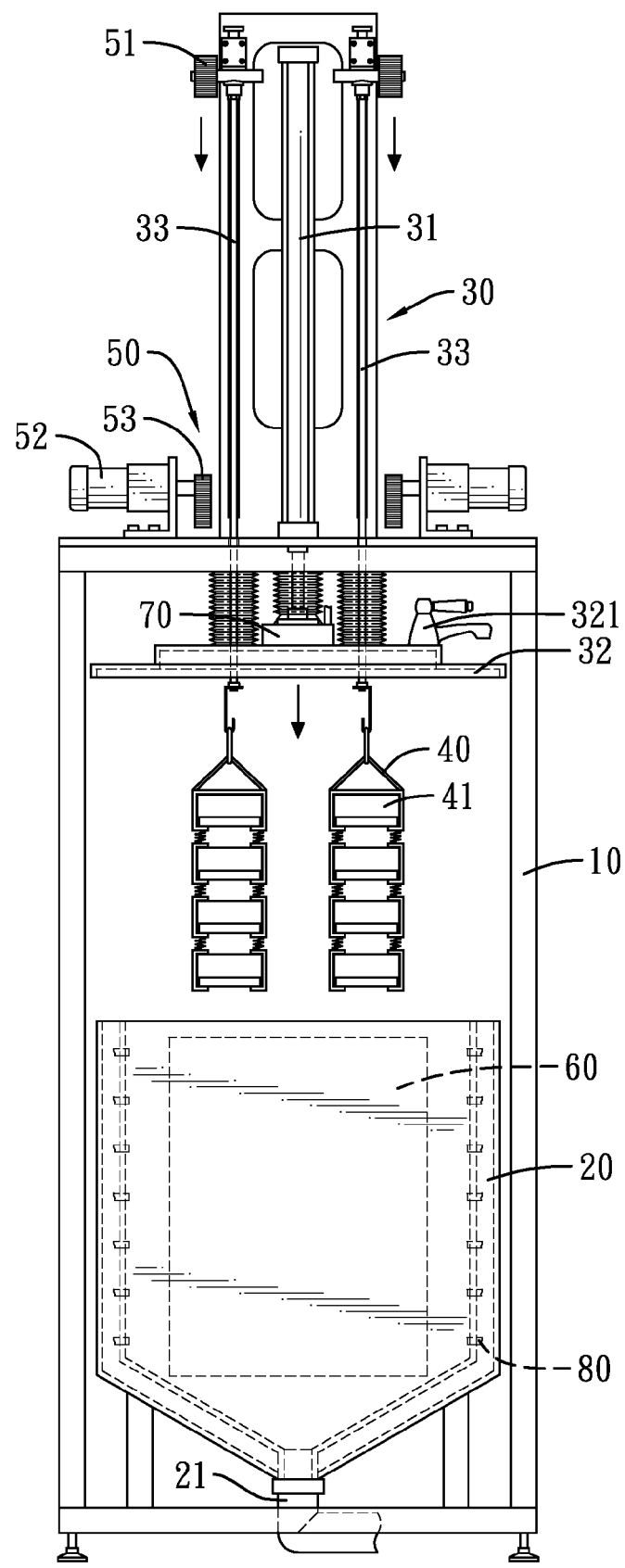
FIG. 1 is an operational front view of an ultrasonic oscillation machine for manufacturing porous collagen matrices, showing the frames being moved into the vessel.

With reference to FIG. 1, an ultrasonic oscillation machine in accordance with the present invention comprises a hollow body 10, a vessel 20, a conveyor 30, multiple frames 40, multiple oscillation devices 50, an ultrasonic mechanism 60, a vacuum pump 70 and a spraying mechanism 80.

The vessel 20 is mounted securely in the body 10 and is mounted near a bottom of the body 10. The vessel 20 has a discharging pipe 21 mounted on a bottom of the vessel 20 and protruding out of the body 10.

The conveyor 30 is mounted through a top of the body 10 and comprises a hydraulic cylinder 31, a cover 32 and multiple supporting rods 33. The hydraulic cylinder 31 is mounted on the top of the body 10. The cover 32 is connected to the hydraulic cylinder 31, selectively seals the vessel 20 and has a pressure relief device 321 mounted thereon. The supporting rods 33 are mounted vibratile through the top of the body 10 and the cover 32 and are connected to the hydraulic cylinder 31.

Figure 2:
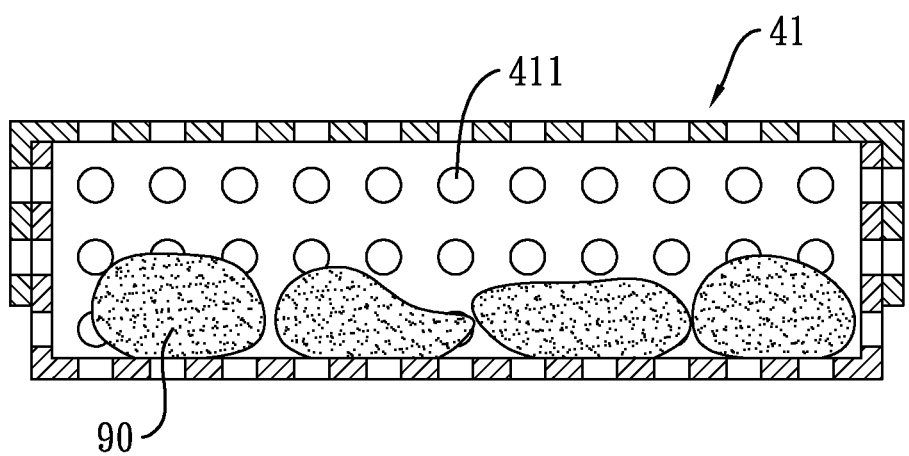
FIG. 2 is an enlarged side view of a container of the ultrasonic oscillation machine in FIG. 1.

With reference to FIGS. 1 and 2, the frames 40 connect to the conveyor 30 and are selectively mounted in the vessel 20. In a preferred embodiment, the frames 40 are respectively hung on the supporting rods 33. Each frame 40 has multiple containers 41 inserted therein. Each container 41 has multiple holes 411 formed therethrough.

Each oscillation device 50 connects to and selectively vibrates a corresponding frame 40 and comprises a spur gear 51, a motor 52 and an eccentric gear 53. The spur gear 51 is mounted securely on the corresponding supporting rod 33. The motor 52 is mounted on the body 10. The eccentric gear 53 is driven by the motor 52 and selectively engages the spur gear 51.

The ultrasonic mechanism 60 is mounted in the vessel 20.

The vacuum pump 70 is mounted on the cover 32 and selectively extracts the air in the vessel 20 to create vacuum in the vessel 20.

The spraying mechanism 80 is mounted in the vessel 20 and selectively sprays water to moisten the subjects in the containers 41. The spraying mechanism 80 may comprise multiple nozzles. The water sprayed into the vessel 20 is discharged out from the discharging pipe 21.

With reference to FIGS. 1 and 2, connective tissues 90 are put in the containers 41. The hydraulic cylinder 31 pushes the cover 32 to move downward and seals the vessel 20 and the frames 40 are also moved into the vessel 20. The vacuum pump 70 may create vacuum in the vessel 20 when the cover 32 seals the vessel 20.

Figure 3:
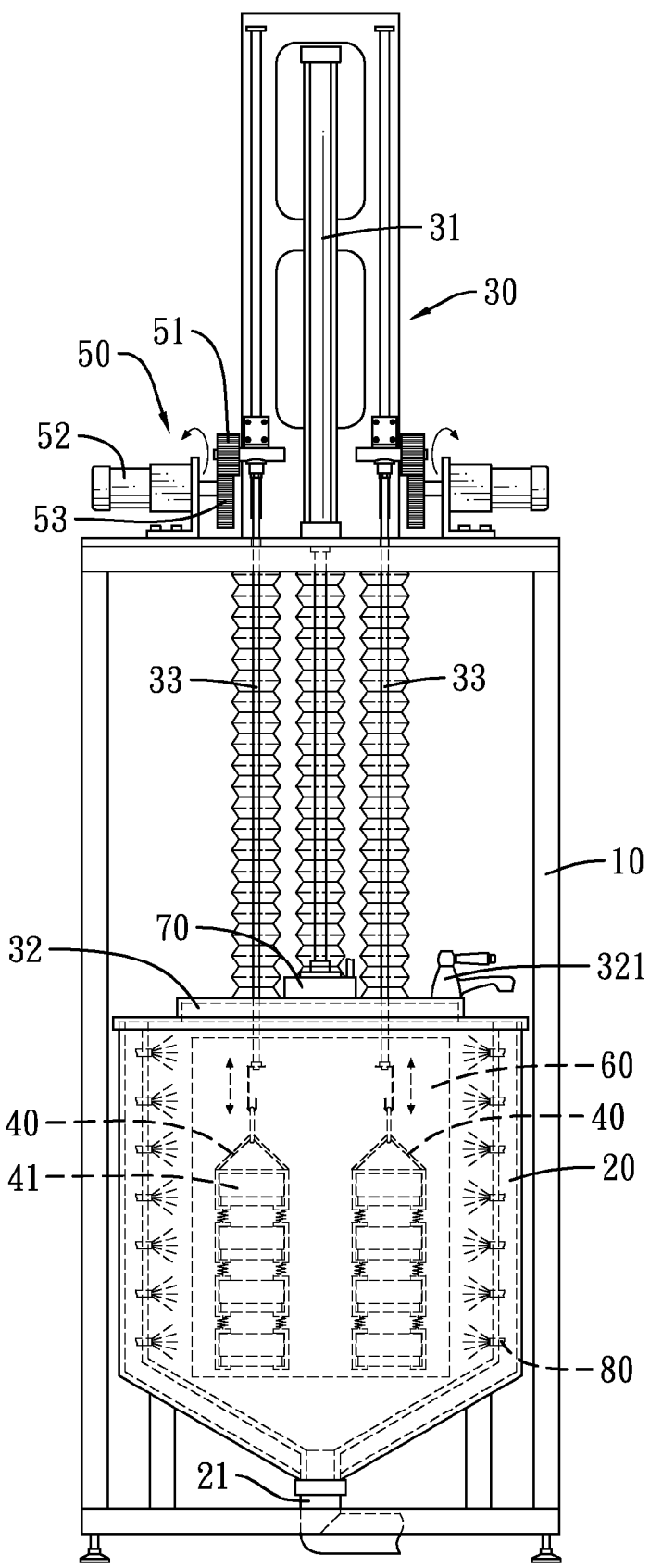
FIG. 3 is an operational front view of the ultrasonic oscillation machine in FIG. 1, showing the frames oscillating.
Figure 4:
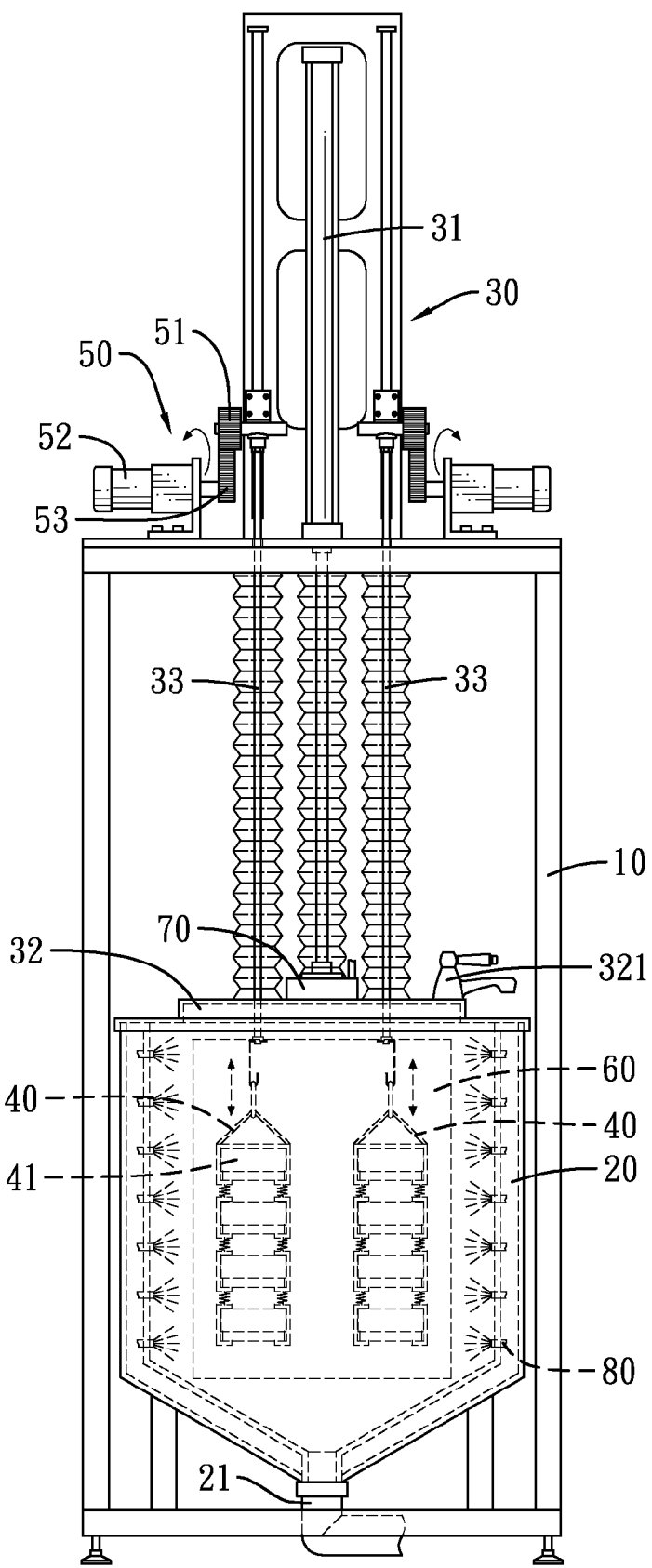
FIG. 4 is another operational front view of the ultrasonic oscillation machine in FIG. 1, showing the frames oscillating.

With reference to FIGS. 3 and 4, the motors 52 operate and the eccentric gears 53 are rotated to drive the spur gears 51 to rotate and oscillate. Therefore, the supporting rods 33 oscillate to vibrate the frames 40 and containers 41. The ultrasonic mechanism 60 and the spraying mechanism 80 also operate. Then the connective tissues in the containers 41 gradually become porous collagen matrices.

When the manufacturing process is finished, the pressure relief device 321 is operated to allow the air to infuse into the vessel 20. Then the hydraulic cylinder 31 pulls the cover 32 and the frames 40 to move upward and leave the vessel 20. Then the manufacturer may take the containers 41 out of the frames 40.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An ultrasonic oscillation machine comprising:
a hollow body;
a vessel mounted securely in the body;
a conveyor mounted through the body;

multiple frames connecting to the conveyor and selectively mounted in the vessel, and each frame having multiple containers inserted therein;

multiple oscillation devices connecting to and selectively vibrating a corresponding frame; and an ultrasonic mechanism mounted in the vessel with the conveyor comprises a hydraulic cylinder mounted on the top of the body; a cover connected to the hydraulic cylinder and selectively sealing the vessel; and multiple supporting rods mounted vibratile through the top of the body and the cover and connected to the hydraulic cylinder; and the frames are respectively hung on the supporting rods.

2. The ultrasonic oscillation machine as claimed in claim 1, wherein each oscillation device comprises a spur gear mounted securely on the corresponding supporting rod;

a motor mounted on the body; and an eccentric gear driven by the motor and selectively engaging the spur gear.

3. The ultrasonic oscillation machine as claimed in claim 1 further comprising a vacuum pump mounted on the cover, wherein the cover has a pressure relief device mounted thereon.

4. The ultrasonic oscillation machine as claimed in claim 2 further comprising a vacuum pump mounted on the cover, wherein the cover has a pressure relief device mounted thereon.

5. The ultrasonic oscillation machine as claimed in claim 1 further comprising a spraying mechanism mounted in the vessel, wherein the vessel has a discharging pipe mounted on a bottom of the vessel and protruding out of the body.

6. The ultrasonic oscillation machine as claimed in claim 1 further comprising a spraying mechanism mounted in the vessel, wherein the vessel has a discharging pipe mounted on a bottom of the vessel and protruding out of the body.

7. The ultrasonic oscillation machine as claimed in claim 2 further comprising a spraying mechanism mounted in the vessel, wherein the vessel has a discharging pipe mounted on a bottom of the vessel and protruding out of the body.

8. The ultrasonic oscillation machine as claimed in claim 3 further comprising a spraying mechanism mounted in the vessel, wherein the vessel has a discharging pipe mounted on a bottom of the vessel and protruding out of the body.

9. The ultrasonic oscillation machine as claimed in claim 4 further comprising a spraying mechanism mounted in the vessel, wherein the vessel has a discharging pipe mounted on a bottom of the vessel and protruding out of the body.

* * * * *